United States Patent [19]

Koch

[11] Patent Number: 4,703,585
[45] Date of Patent: Nov. 3, 1987

[54] DEVICE FOR OPENING AND CLOSING VEHICLE DOORS

[76] Inventor: Hermann Koch, Kleiststrasse 9, D-7000 Stuttgart 1, Fed. Rep. of Germany

[21] Appl. No.: 821,680
[22] PCT Filed: Apr. 19, 1985
[86] PCT No.: PCT/DE85/00129
§ 371 Date: Feb. 21, 1986
§ 102(e) Date: Feb. 21, 1986
[87] PCT Pub. No.: WO85/04926
PCT Pub. Date: Nov. 7, 1985

[30] Foreign Application Priority Data

Apr. 19, 1984 [DE] Fed. Rep. of Germany ....... 3414890

[51] Int. Cl.4 ............................................. E05D 15/10
[52] U.S. Cl. ....................................... 49/223; 49/216
[58] Field of Search ................ 49/149, 162, 177, 178, 49/180, 221-223, 212, 216

[56] References Cited

U.S. PATENT DOCUMENTS 1,992,830 2/1935 Mattila ................................. 16/147
2,557,614 6/1951 Schafer ................................ 49/212
3,201,169 8/1965 Scott ................................... 296/44

FOREIGN PATENT DOCUMENTS 1148460 5/1963 Fed. Rep. of Germany .
1240440 5/1967 Fed. Rep. of Germany .
1919990 11/1970 Fed. Rep. of Germany .
2448462 2/1972 Fed. Rep. of Germany .
2105658 8/1972 Fed. Rep. of Germany .

Primary Examiner—Kenneth Downey
Attorney, Agent, or Firm—Edwin E. Greigg

[57] ABSTRACT

A device for opening and closing vehicle doors is proposed, in which pivot levers 15, 16 operate between the vehicle door 10 and the vehicle body 11 and with their ends engage longitudinally displaceable guide elements 25, 26, which run on guide rails 23, 24 located on the vehicle and on the vehicle door 10. The pivot levers 15, 16 indirectly engage the body 11 of the vehicle via an intermediary part 14, and the intermediary part 14 is pivotably attached to the body 11 in the standard door stops 12. The pivot levers 15, 16 form a lever system in the manner of a multi-member kinematic chain, and the kinematics of the lever system can be modified by means of an actuating device such that the vehicle door 10 can function in either the normal swiveling mode or in a sliding mode.

21 Claims, 12 Drawing Figures

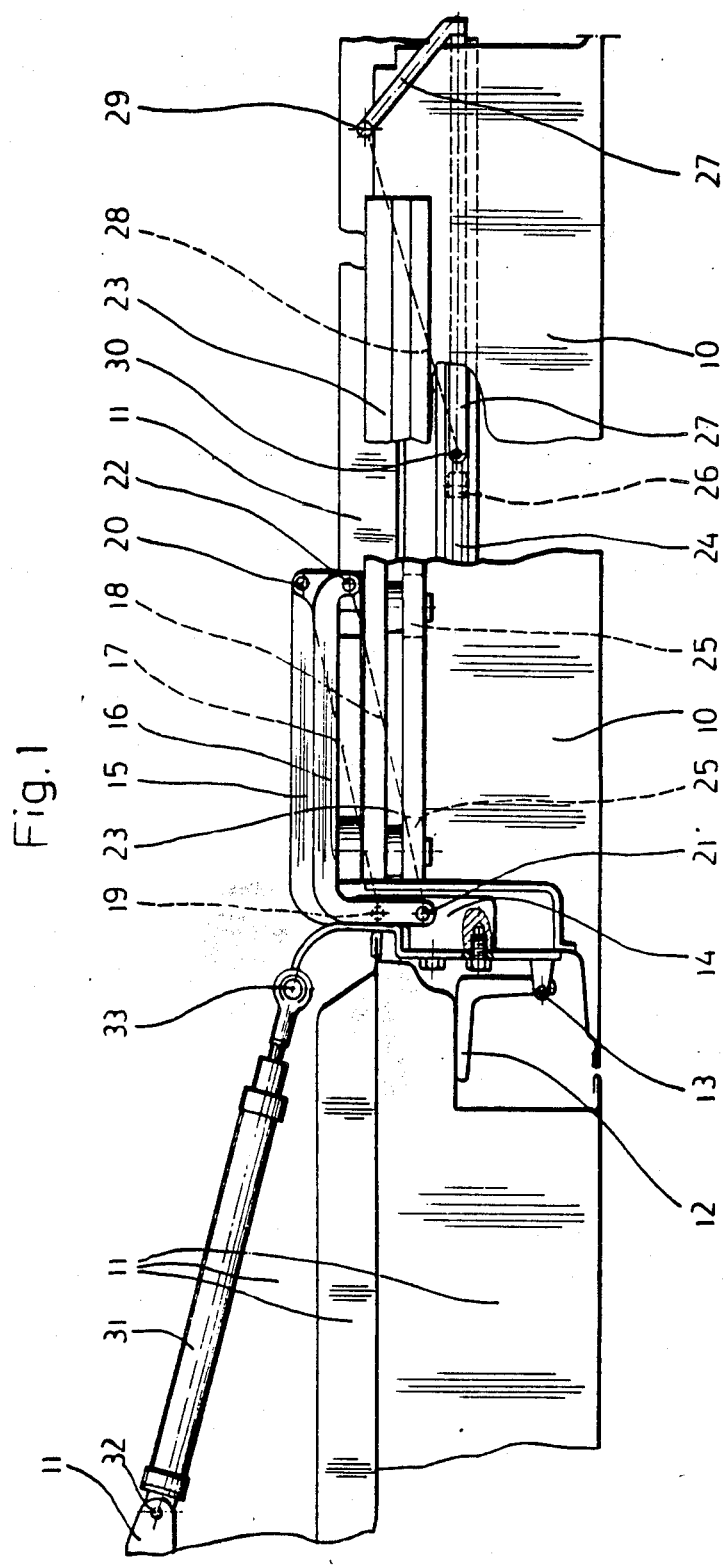

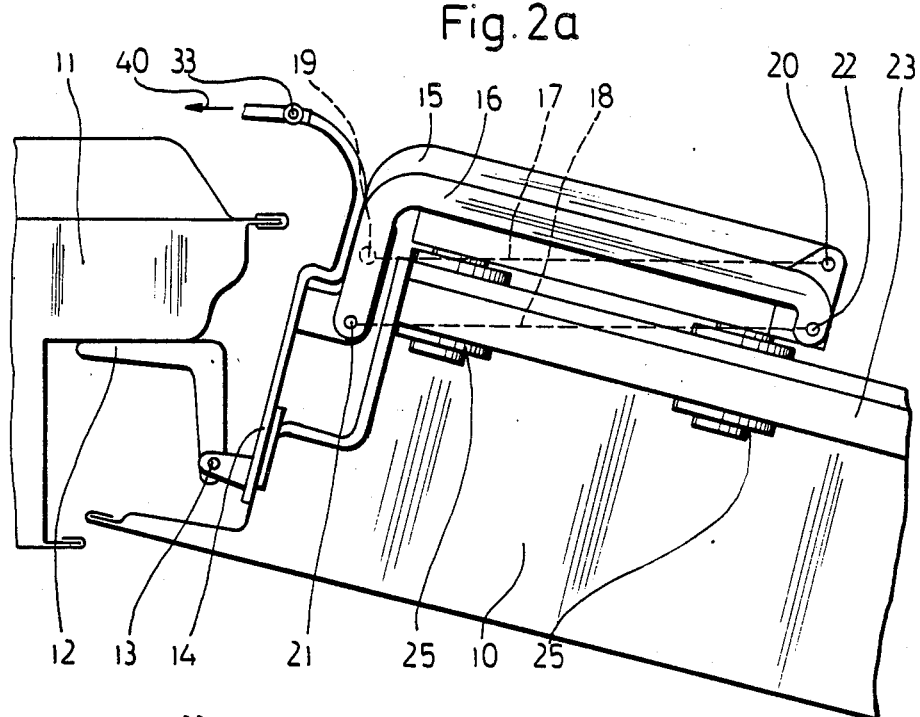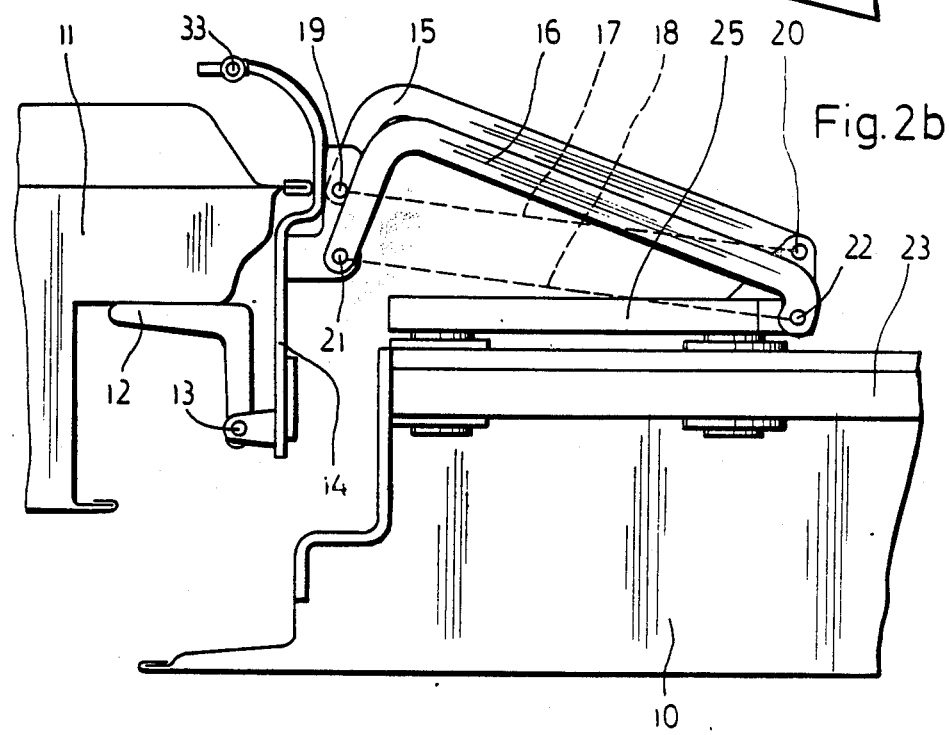

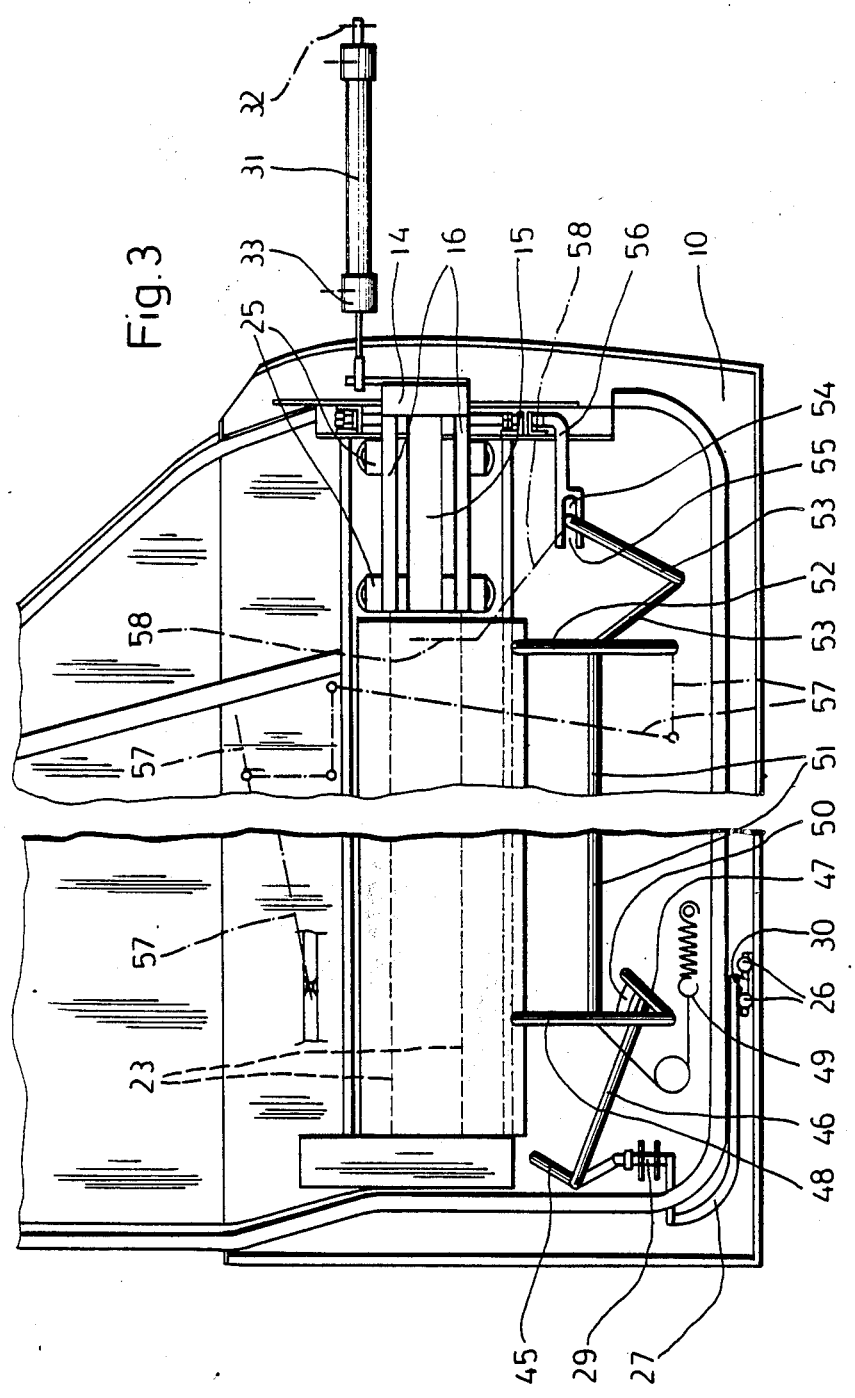

DEVICE FOR OPENING AND CLOSING VEHICLE DOORS

PRIOR ART

The invention is directed to improvements in a device for opening and closing vehicle doors.

Devices for actuating vehicle doors are known in which a door of a passenger vehicle functions as a sliding door by means of pivot levers and slide rails (German Patent No. 1 780 577). These known doors can be operated solely as sliding doors, and at first glance it is not apparent whether they operate as sliding doors or how they are to be operated. However, an important safety factor for a motor vehicle is that it must be possible to open the doors quickly and easily after an accident. If a door operates only by sliding, then its reliable function depends solely on the friction-free sliding of the pivot lever on the slide rails. Even the least deformation of the pivot lever and slide rails prevents sliding of the door. But even if the function is satisfactory, rescuers after an accident may become frustrated, because it is impossible to be sure that everyone will know not only that sliding doors may be present but also how to operate them.

ADVANTAGES OF THE INVENTION

The device according to the invention for opening and closing vehicle doors has the advantage over the prior art that the vehicle door operates in the sliding mode only after being especially activated; without this special activation, the vehicle door is opened and closed by swivelling, like every other vehicle door.

The device according to the invention has the advantage that it can be retrofitted into mass-production vehicles, without requiring substantial changes to the vehicle body. Either both front doors, or only one front door, can be converted. One important application is the equipping of vehicles for the handicapped in a user-friendly way, so that the handicapped persons can for instance approach the vehicle in a wheel chair and then enter the vehicle from the wheel chair and finally store the wheel chair in the vehicle.

The device according to the invention is not only advantageous in vehicles especially converted for the handicapped; it also enables boarding and/or leaving the vehicle in situations where traffic or a lack of space make it impossible to open a swinging door very far. The opportunity of additionally using the door in the sliding mode does not in any way lessen the safety of the vehicle, because even if the parts needed for sliding operation should become deformed, the door can still be actuated like a normal vehicle door. After conversion with the device according to the invention, the vehicle door still engages the same door stops, which are located on the body and are of a standard type. Thus all the structural provisions that are provided as standard equipment for the vehicle contribute to increasing the passive safety of the vehicle. It is accordingly also possible to retrofit safety vehicles, as an example.

The invention is advantageously further developed such that for attaching the elements of the lever system to the body indirectly, an intermediary part is provided, which is engaged by levers of the lever system and which is secured on the body such that it can pivot in the door-opening direction. This feature allows a favorable structuring of the lever system, the lever lengths of which are now no longer dictated by the spacing between the body and the points of engagement on the vehicle door. If the intermediary part is advantageously attached to the parts of the hinged joint for the vehicle door that are already provided in the standard vehicle, then the lever lengths of the lever system can, by structuring the intermediate element accordingly, be dimensioned for an optimal course of movement when the vehicle door is in the sliding mode.

A further advantageous embodiment of the invention provides that a main guide rail is attached to the vehicle door, while a support guide rail is attached to the threshold of the door on the body, these guide rails guiding the guide elements in a longitudinally movable manner; further, for sliding-door operation of the vehicle door, the guide element that cooperates with the support guide rail can be brought into engagement with the support guide rail by means of the actuating device. Because the guide element sliding on the support guide rail cooperates with this support guide rail only when vehicle door operation has been switched over to the sliding mode by means of the actuating device, there are no hindrances to operating the door or to entering and leaving the vehicle, and there are no structural elements that lessen the passive safety of the vehicle door.

An advantageous embodiment of the lever system according to the invention provides that this system comprises a parallelogram lever drive and a lever drive of the slider crank drive type, with the longitudinally displaceable element of the slider crank drive reprsenting the guide element that travels on the support guide rail and the parallelogram lever drive joining the intermediary part to the guide element that is longitudinally displaceable on the main guide rail. In a specific phase, the lever system operates as a six-member kinematic chain (according to the Stephenson principle). The length of the two parallel-acting levers of the parallelogram lever drive, which corresponds to the effective length of the lever of the slider crank drive functioning like the connecting rod of the crank drive, dictates the distance by which the vehicle door, in its swivelling mode, is swung outward. Because the levers of the parallelogram lever drive engage the intermediary part, rather than engaging the vehicle body directly, it is advantageously simple to determine by structural means how far the vehicle door should be deflected outward for sliding operation. This embodiment of the lever system as a six-member kinematic chain furthermore makes a particularly favorable course of movement from the pivoting operation possible, in order to initiate the sliding mode of the vehicle door. The given cooperation of the parallelogram lever drive and the slider crank drive has the effect that the vehicle door is initially swivelled partly open, with the guide element exerting a thrust piston action upon the support guide rail, in which the lever that cooperates with it acts like a connecting rod and the vehicle door acts like a crank. The adhesive resistance of the vehicle door, existing for instance because of sticking rubber seals, does not have to be overcome with the jerking movement typical of sliding doors, in which the entire rubber seal has to be moved away from the surface on which it rests; instead, because of the pivoting movement that precedes the sliding movement the seal of the vehicle door advantageously gives way gradually.

Naturally the lever system may also be embodied as a four-member kinematic chain, without having to give up these basic advantages mentioned above, namely the advantages of the transition from a swiveling to the sliding movement.

According to an advantageous embodiment of the invention, an auxiliary spring acts between the body and the intermediaty part in at least the closing direction of the door-pivoting movement. This spring force must be overcome before the intermediate element pivots about the hinge link 13. As described above, the lever parallelogram remains unchanged during this initial swivelling. This auxiliary spring also reinforces the closing movement of the door, so that when a door is shut it is easier to overcome such resistances to closing as those offered by the rubber seals and by unfavorable lever proportions.

As one form of realizing this embodiment, a pneumatic cylinder can serve as the auxiliary spring, its compressible space that generates the spring action being selectable by means of a control valve. This pneumatic cylinder is disposed substantially horizontally; as a result, it acts in the swivelling plane. If the vehicle door is to be operated only in the swivelling mode, and the intermediary part is pivoted further about the hinge, i.e., so that it does not return to its outset position as it does in the sliding mode, then to enable further swivelling the spring action of the pneumatic cylinder must be cancelled by releasing the compressed pneumatic cylinder via the control valve.

In another realization of this embodiment with an auxiliary spring provided in the form of a pneumatic cylinder, the pneumatic cylinder is arranged substantially transversely to the swivelling direction (swivelling plane), being joined pivotably to the body at one end and at the other end being joined to a sliding block that runs on a guide rail and is coupled to the intermediary part, so that depending upon the swiveling position of the pneumatic cylinder and thus depending on the given operative direction of the spring, this operative direction extends from the closing direction through the neutral into the opening direction of the door. As a result, it is advantageously possible to use merely a compression spring of any type rather than a pneumatic spring, an example being a helical spring disposed in a telescoping cylinder, because cancelling the pneumatic spring action is not required in purely swivelling operation. Advantageously, this spring reinforces the complete opening of the door in purely swivelling operation. Naturally, as the spring acts in the opposite direction depending upon the position into which it is pivoted, some other arrangement can also be used, similar to that known in cabinetry in which in the closed position of the cabinet door, this spring simultaneously acts to keep the door closed.

A further advantageous feature of this embodiment is that when the vehicle door is closed the directions in which force is exerted by the paralellogram lever drive and the slider crank drive are the same. Thus when the vehicle door is closed, there is a stable position of repose for the three levers, which act in parallel in this position, before the initial pivoting of the vehicle door in preparation for sliding operation takes place. On initial pivoting, the two levers of the parallelogram lever drive act counter to the restoring force of the auxiliary spring, up to the end point, determined by a stop, of the slider crank drive guide element that acts like a piston. No later than when the end point is reached, the auxiliary spring reinforces the movement of the vehicle door, until the slider crank drive lever that acts like a connecting rod acts parallel to the two levers of the paralellogram lever drive, with respect to the longitudinal axis of the door.

Contrarily, if the actuating device for changing from swivelling operation to sliding operation is set such that the door operates in the swivelling mode, then the slider crank drive is not engaged, and a movement between the vehicle door and the intermediary part can accordingly be blocked by providing the actuating device with a lock that rigidly couples the intermediary part to the vehicle door. In an exemplary embodiment, the lock may be embodied as a lifting bolt, which engages aligned bores located in straps on the intermediary part and on the vehicle door.

A further embodiment of the invention provides that the actuating device for switching over from the swivelling to the sliding mode has a transmission link system, which causes the longitudinally movable guide element of the slider crank drive to engage the support guide rail. It is thus possible by means of a single actuation, both to release the lock between the vehicle door and the intermediary part, so that the parallelogram lever drive can function, and to switch on the slider crank drive, so that the entire lever system can function in the manner described. The engagement of the slider crank drive can be realized particularly simply as a stroke movement, so that according to an advantageous embodiment the transmission link system has at least one toggle joint, which is actuatable at its toggle lever, which in turn has a stationary pivot point on the vehicle door and the opposite lever end of which travels on a guide and causes the guide element of the slider crank drive to engage the support guide rail.

A further embodiment provides that a restoring force is present which retains the transmission link system firmly in a stable position of repose for the swivelling mode of the vehicle door. This embodiment of the invention makes it possible for the vehicle door, each time it is to be opened again following a change to the sliding mode, can be operated in the swivelling mode once again without special measures being required. This feature is particularly valuable in terms of passive safety, because in an emergency the vehicle door can be actuated in the usual manner, and rescuers will not be frustrated by being confronted with an unfamiliar door-opening mechanism.

Further advantages and advantageous embodiments of the invention will become apparent from the ensuing description, drawing and claims.

BRIEF DESCRIPTION OF THE FIGURES

One exemplary embodiment of the invention is shown with variants in the drawing and will be described in further detail below. Shown are:

FIG. 1, a horizontal longitudinal section taken through a vehicle door and the adjoining portion of the body, with a plan view on the lever system;

FIGS. 2a and 2b, a detail of FIG. 1, on a larger scale, for explaining the functional structure of the parallelogram lever drive;

FIG. 3, an inside view of the vehicle door, once again on the smaller scale;

DESCRIPTION OF THE EXEMPLARY EMBODIMENT

Figure 4:
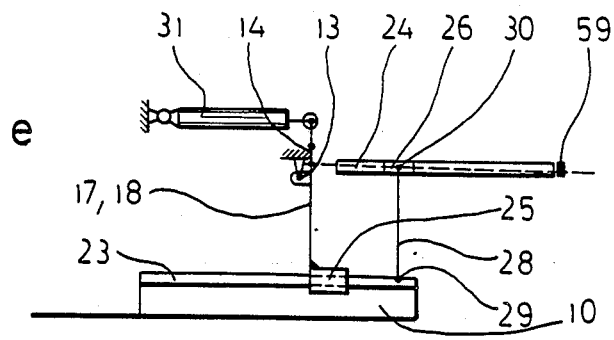
FIG. 4, in schematic fashion, the mode of operation of the lever system according to the invention in individual functional positions 1-3.

In the longitudinal section of FIG. 1, the vehicle door is shown at 10 and the elements that are part of the vehicle body are shown at 11. A door stop 12 mounted on the body 11, which is a standard item and serves to secure a vehicle door, bears via hinge elements 13 the intermediary part 14, which is engaged by the parallelogram levers 15 and 16 of the parallelogram lever drive. The parallelogram lever 15 acts in the direction of the line of force 17 and is supported in the pivot bearings 19 and 20; the parallelogram lever 16 acts in the direction of the line of force 18 and is supported in the pivot bearings 21 and 22.

The main guide rail 23 is located on the vehicle door 10, and the support guide rail 24 is located on the body 11. The longitudinally movable guide element 25 runs on the main guide rail 23, and the longitudinally movable guide element 26 runs on the support guide rail 24. The guide element 25 is connected with the respective ends of the parallelogram levers 15 and 16 via the pivot bearings 20 and 22. The guide element 26 is located at one end of the lever 27, which exerts force as indicated by the line of force 28. The lever 27 is supported in the pivot bearings 29 and 30; the pivot bearing 29 is located on the vehicle door 10 and the pivot bearing 30 is located on the guide element 26, which slides on the support guide rail. The intermediary part 14 is also engaged by the auxiliary spring, which is embodied as a pneumatic cylinder 31. One end of the pneumatic cylinder 31, being movable about the shaft 32, engages the body 11 of the vehicle, while the other end engages the shaft 33 on the intermediary part 14.

In FIG. 1, none of the elements of the actuating device are shown. Instead, FIG. 1 shows the lever system, comprising the parallelogram lever drive having the parallelogram levers 15 and 16 and the lever 27, and shows how this system cooperates with the vehicle door and the body. The intermediary part 14 is pivotable relative to the body 11 about the hinge joint 13 and is movable relative to the parallelogram levers 15 and 16 about the pivot bearings 19 and 21.

In FIG. 1, the vehicle door 10 is shown when closed. In this state, the two parallelogram levers 15 and 16 act parallel to the lever 27, as the parallel lines of force 17, 18 and 28 indicate. The lever 27, acting in the line of force 28, is part of a slider crank drive. The part acting as a thrust piston is the guide element 26 on the support guide rail 24. The action as a connecting rod on the part of the lever 27 is indicated by the line of force 28, because the lever 27 is movable in both bearings 29 and 30. Acting as the crank of the slider crank drive is the vehicle door 10.

The mode of operation of the lever system as a whole is described below in conjunction with FIG. 4.

In FIG. 2a, the vehicle door 10 is shown in the first, outwardly pivoted state, in which the intermediary part 14 is pivoted in the hinge joint 13 of the door stop 12. In the normal swivelling mode of the door, this pivoting operation is continued, with further rotation about the hinge joint 13. According to the invention, the first, initially pivoted state of the vehicle door can also shift into the sliding mode, however. The initial pivoting is effected counter to spring force 40. In this swivelling operation, the parallelogram levers 15 and 16 change their position without the parallelogram itself thereby being changed.

In FIG. 2b, the vehicle door is shown after the extended position of the parallelogram levers 15, 16 and of the lever 27 has been surpassed. The spring force 40 has retracted the intermediate element 14 back into its initial position. In this operation, the parallelogram levers 15 and 16 have moved, and the vehicle door 10 can now be swung open far enough that it can be slid along the body 11. For the entire ensuing portion of the sliding movement of the vehicle door 10, the intermediate element remains in the position shown in FIG. 2b, although the hinge joint 13 remains freely movable. Because the parallelogram levers 15 and 16 engage the intermediary part 14, rather than directly engaging the hinge joint 13 of the door stop 12, or the body 11, the distance between the vehicle door 10 and body 11 in the outwardly pivoted state can be fixed as needed for sliding operation.

As FIGS. 2a and 2b also show, the vehicle door 10 can be released for sliding operation only if the two parallelogram levers 15 and 16 are capable of movement relative to the vehicle door 10. This movement can be prevented by locking the intermediary part 14 on the vehicle door; however, to do so, the slider crank drive (10, 26, 27; not shown in FIG. 2) must be disengaged. The cooperation of the slider crank drive with the parallelogram lever drive is shown in FIG. 3.

FIG. 3 is an interior view of the vehicle door 10, which has been converted by equipping it with the lever system according to the invention as well as the actuating device therefor. The parallelogram lever 16 of the parallelogram lever drive is provided in duplicate here, in order to increase the mechanical strength, since because of the weight of the vehicle door, considerable moment is transmitted via the guide element 25, which slides on the main guide rail 23. In FIG. 3, the lever 27 is in the position of repose and for the swinging mode of the vehicle door. The lever 27 is movable downward, toward the support guide rail (not shown in this figure), via a toggle lever 45. In its lower end position, the guide element 26 engages the support guide rail, also not shown in the drawing. The toggle lever 45 is connected to the toggle lever 48 via the levers 46 and 47. The toggle lever 48 is retained in the end position shown via the restoring force of the spring 49. A coupling arm 50 operates between the toggle lever 48 and the lever 47 such that the toggle lever 45 is pulled until after there has been a certain amount of inward deflection of the toggle lever 48. The toggle lever 48 cooperates via a connecting lever 51 with a further toggle lever 52. In addition to the connecting lever, a V-shaped lever 53, which on its other end has an eccentric element 54, engages the fulcrum of the toggle lever 52. The eccentric element 54 cooperates with the slit 55 of the lifting bolt 56.

The actuating device for switching over to the sliding mode includes the individual elements 45–56. The switchover is effected by deflecting the toggle levers 48 and 52 inward. This can be accomplished either via a link mechanism, not shown in detail but suggested by the dot-dash line 57, from outside the vehicle door, or from inside the vehicle door 10, as indicated by the line 58. The deflection inward of the two toggle levers 48 and 52 means that the connecting lever 51 is displaced in the direction of vehicle travel and that the angle of the V-shaped lever 53 becomes more acute. As a result, the eccentric element 54 exerts force on the slot 55 and lifts the lifting bolt 56, which triggers a locking mechanism, not shown in detail in the drawing, locking the intermediate element 14 to the vehicle door 10, which enables a movement of the two parallelogram levers 15 and 16 in the manner shown in FIG. 2. After that, the vehicle door can be operated as a sliding door only by intentionally switching it over from pivoting to sliding operation at 57 or 58, and the restoring force of the spring 49, partially by means of elements not shown in FIG. 3, returns the transmission link system comprising the elements 45–54 back to the position of repose after each actuation, in which position the vehicle door can be opened and closed as a swivelling door.

A control valve required in the variant of FIGS. 1 and 2 (also not shown there) allows the pneumatic cylinder 31 to act as an auxiliary spring only when there is a switchover to the sliding-door mode.

FIG. 4, in the positions a–e shown in order, explains the mode of operation of the lever system according to the invention for the transition from the swivelling mode to the sliding mode. All the elements of the actuating device for the switchover from the swivelling to the sliding mode have been omitted in the drawing, and all the levers replaced by their lines of force.

Position a shows the vehicle door 10 in the closed state. The lines of force 17, 18 and 28 are then parallel. The end position of the guide element 26 is limited by a stop 59. This stop may for instance be embodied as a magnet, so as to attain a certain adhesion of the guide element 26 in its end position. The parallelogram lever system (17, 18) engages the intermediary part 14 and the guide element 25. The opening phase for the sliding mode of the vehicle door 10 is initiated by initial pivoting of the back end of the vehicle door (position b). In so doing, the forces of friction of the closed vehicle door 10 are gradually overcome. Then the slider crank drive, which is embodied by the guide element 26, acting as a piston and guided by the support guide rail 24; by the lever, represented by the line of force 28 and acting as a connecting rod, which is pivotable on the bearings 29 and 30; and by the vehicle door acting as a crank. The guide element 26 runs as far as the end of the first portion of movement, shown in position b, counter to the spring force of the pneumatic cylinder 31. The intermediate element 14 does not yet move relative to the door. The guide element 26 is now fixed in its end position by the stop 59, so that the spring action of the pneumatic cylinder 31 pulls the vehicle door 10 into an intermediate position, which is shown in position c. In the lever movements from position b to position c, the entire arrangement comprising the parallelogram lever drive 17, 18, the elements 10, 26, 28 belonging to the slider crank drive, and the hinge joint 13 operates as a six-member kinematic chain on the Stephenson principle; the elements 10, 26 and 28 do not function as a slider crank drive, because the element 26 is restrained by the stop 59, for instance by its magnetic force. In position b, the lines of force 17, 18 and 28 of the levers are not parallel; in position c, on the contrary, the lines of force of all the levers, that is, the lines of force 17, 18 and 28 run in the same direction (i.e. they are parallel). The pneumatic cylinder in position c is again in its position of repose, and accordingly exerts no further force upon the lever system. The movement of the vehicle door from position c to position d is effected as a purely parallel shifting of the door 10, which requires a pivoting of the levers. The guide element 26 remains in its end position at the stop 59, and the levers now operate like a four-member kinematic chain, that is, like a parallelogram lever arrangement. Once the end position shown in position d has been reached, the vehicle door 10 is shifted longitudinally movably on the main guide rail 23 and the support guide rail 24, as shown in position e, because of the operation of the corresponding guide elements 25 and 26 on the guide rails. The vehicle door 10 is closed in an analogous manner, passing through the phases shown in positions a–e in reverse order.

The smaller the distance between the lines of force 17 and 18 extending in the same direction as well as the line of force 28 becomes (position e), the greater is the loading moment that originates in the weight of the vehicle door 10 and that must be absorbed by the guide elements 25 and 26, but especially the guide element 25.

Figure 5A:
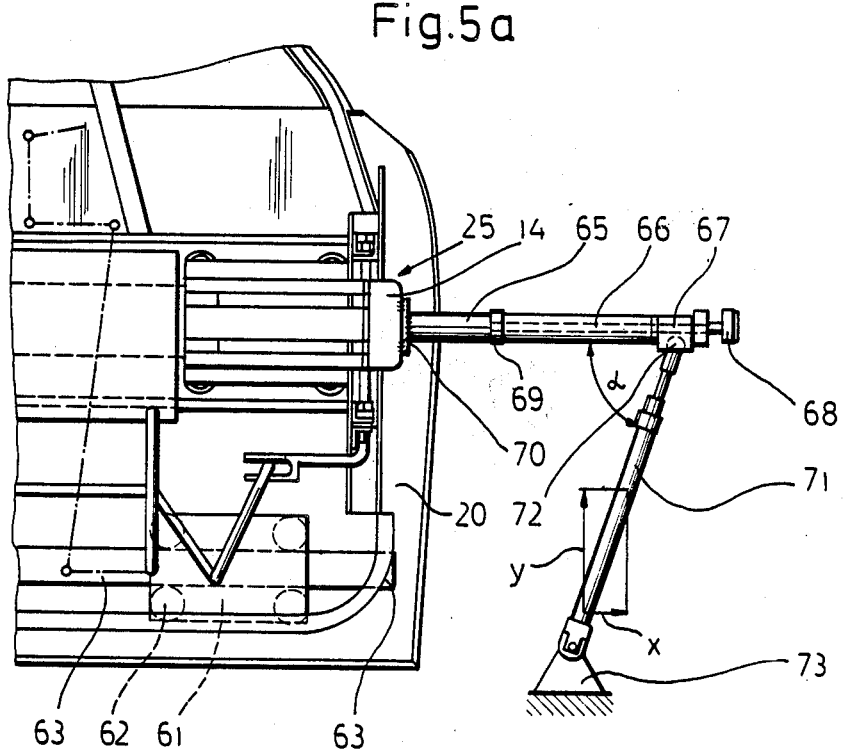
FIG. 5, a fragmentary view corresponding to FIG. 3, with variants of the invention.
Figure 4A:
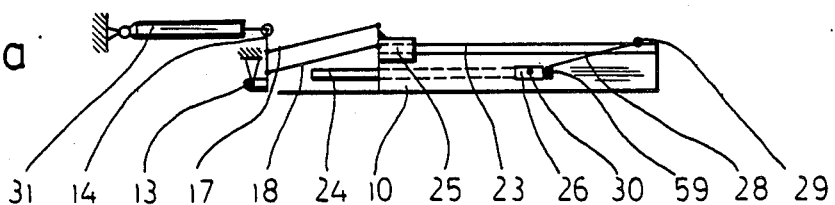
Figure 4B:
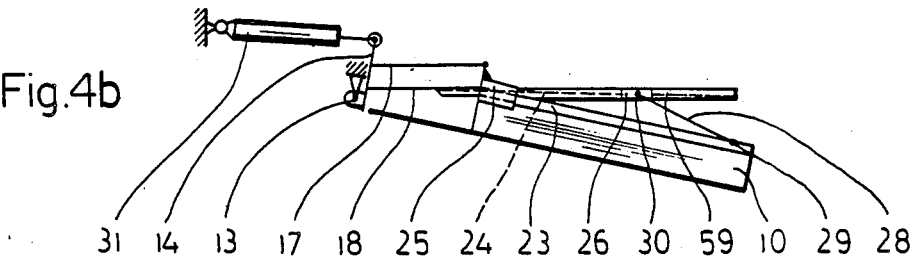
Figure 4C:
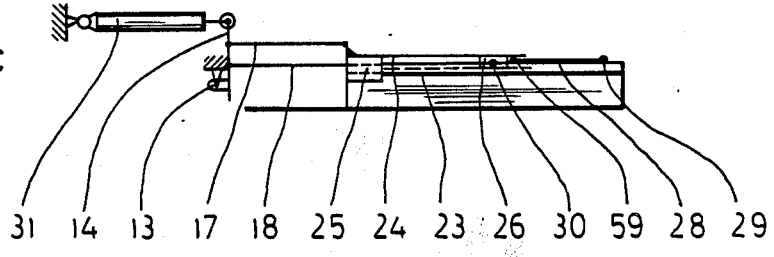
Figure 4D:
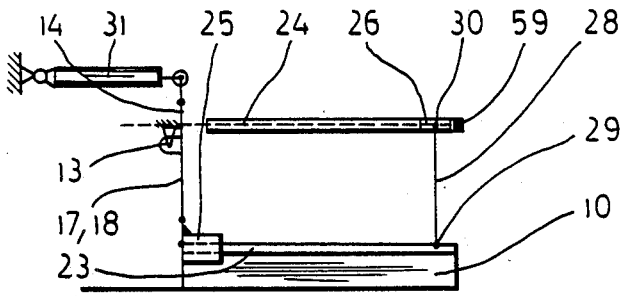
Figure 5B:
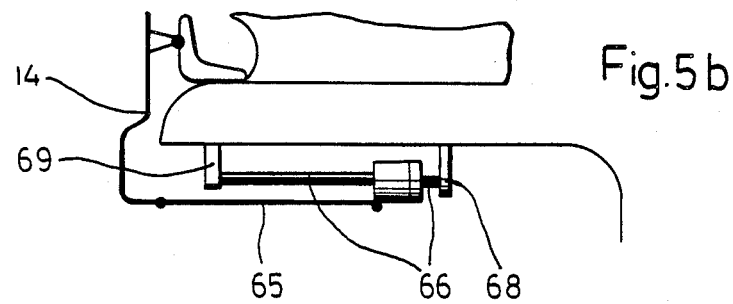

In the illustration of the door according to FIG. 5, which includes variants, an additional guide 61 is secured onto the door, between the rollers 62 of which an additional rail 63 is guided in the direction of displacement of the vehicle door 10. As soon as the vehicle door 10 assumes a sliding position, in which with the door largely opened the moment engaging the guide element 25 is greatly increased, the additional rail 63 is extended so far in the displacement direction of the door 10, by means not shown, on the rollers 62 of the additional guide 61 that it strikes a bearing surface integral with the body, which absorbs the moment and which may for instance be provided on the shock absorber. When the vehicle door 10 is slid back in the closing direction, this additional rail 63 is retracted in an accelerated manner, so that it is fully retracted no later than when the vehicle door 10 is again shifted inward in a parallel manner.

In FIG. 5, a further variant for generating the spring force 40 is also shown. A connecting rod 65 is coupled to the intermediate element 14 of the vehicle door 10 and joined at its other end to a sliding block 67. The sliding block 67 slides on a guide rod 66, the sliding path of which is defined in length by stops 68, 69. The connecting rod 66 may be coupled to the intermediary part 14 via a hinge 70, but it may also be embodied as curved in such a way that no hinge is needed, because the curvature corresponds to the pivoting movement of the intermediate elements 14 about the hinge joint 13. A spring cylinder 71 is articulatedly joined to the sliding block 67 at 72, and on its other end the spring cylinder has a connection 73 that is likewise articulated at some point integral with the vehicle body. Depending on the position of the sliding block 67 and thus on the pivoted position of the door 10, the angle $\alpha$ included between the connecting rod 65 and the spring cylinder 71 varies. The spring force exerted by the spring cylinder 71 is thus divided, depending on the angle, into a horizontal component x and a vertical component y. In the illustrated position of the spring cylinder 71, the vertical component x acts toward the right, that is, in the closing direction of the door, because the sliding block 67 engages the connecting rod 65 in the corresponding direction. Now as soon as the door 10 begins to be pivoted (FIG. 4, position b), this direction of force of the spring cylinder 71 is maintained, even if there is a certain reduction in the spring force due to the shortening of x resulting from the increase in the angle alpha. But this effect is also desirable, as noted above. Now if the door 10 is to be pivoted still further, rather than being shifted to the sliding mode, then the angle $\alpha$ increases beyond 90°, so that beyond a predetermined angle the sliding block 67 slides into its other end position against the stop 69, so that the spring force acts in the opposite direction, that is, in the opening direction of the door when the door is in the pivoting mode. On the other hand, if from the initially pivoted position a switch into the sliding phase is made (FIG. 4, position c), then because of the force of the spring cylinder 71 the intermediary part 14 is retracted back into its initial position, so that the spring cylinder 71 again assumes the position shown in FIG. 5.

Figure 6:
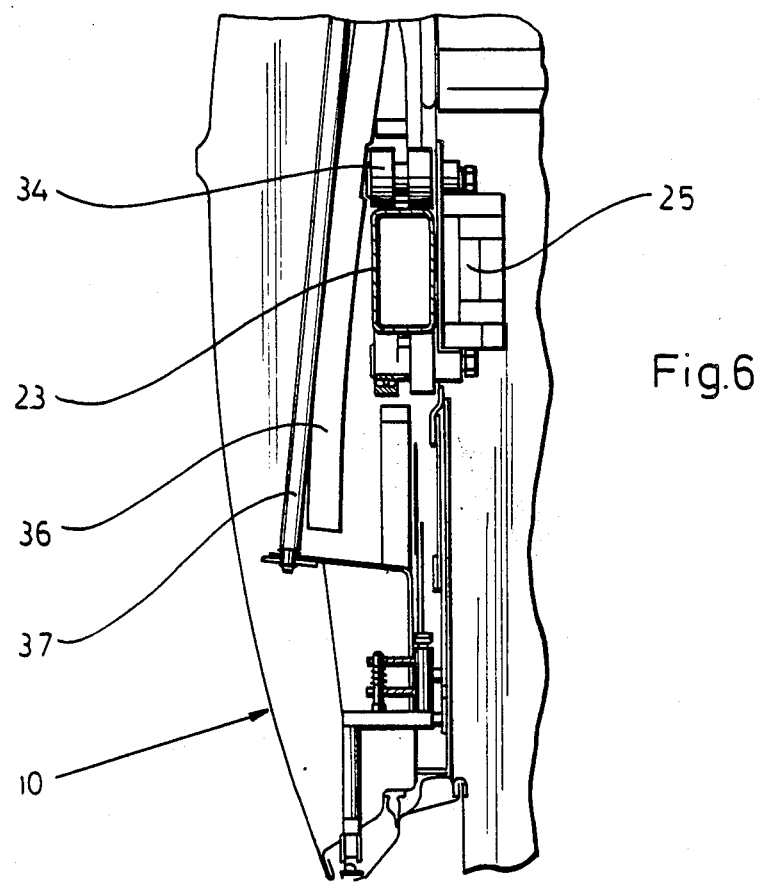
FIG. 6, a vertical longitudinal section through the vehicle door.

In the vertical longitudinal section through the door 10 shown in FIG. 6, the arrangement of the various elements beside one another in the door is shown. The main guide rail 23, on which the rollers 34 of the guide element 25 run, is disposed beside the guide element 25.

According to the invention the window pane 36 of the door 10 is disposed outside the main guide rail 23 relative to the vehicle interior, so as to enable the parallelogram levers to be connected to the intermediary part 14 in the manner described. Since on the other hand the window pane 36 should be disposed as tightly as possible in the center of the door, in order to be able to maintain the required inclination relative to the vertical, the threaded spindle 37 of the window raising system is disposed outside the window pane 36.

I claim:

1. A device for opening and closing vehicle doors having pivot levers operating between the vehicle door and the vehicle body, which slidably engage guide rails, wherein the pivot levers form a multi-member lever system in the manner of a multi-member kinematic chain and elements of the lever system are on the one hand pivotably attached to the body of the vehicle and on the other hand are joined to guide elements that are longitudinally displaceable on guide rails, and that the kinematics of the lever system is modifiable by means of an actuating device such that the vehicle door can be opened or closed selectively by sliding or swivelling, characterized in that the pivotable elements of the lever system (15, 16) are attached to the vehicle body at least indirectly, that the kinematic chain is defined such that upon opening first a conventional initial pivoting is attained and second subsequently a position suitable for sliding movement is reached, and that an intermediary part (14) is provided for indirectly attaching the elements of the lever system to the body, which intermediate part is engaged by the levers of the lever system and secured on the body such that it is pivotable in the door-opening direction.

2. A device for opening and closing vehicle doors as defined by claim 1, characterized in that a main guide rail (23) is attached to the vehicle door (10) and a support guide rail (24) is attached to the door threshold, by which rails guide elements are longitudinally movably guided, and that the guide element (26) cooperating with the support guide rail (24), for sliding operation of the vehicle door, must be brought into engagement with the support guide rail (24) by means of the actuating device.

3. A device for opening and closing vehicle doors as defined by claim 2, characterized in that the intermediary part (14) is attached to the parts of the hinge joint (12, 13) for the vehicle door (10) that are standard on the vehicle.

4. A device for opening and closing vehicle doors as defined by claim 1, characterized in that the lever work operates, depending on its functional position, as a slider crank drive (initial pivoting), as a six-member chain (swivelling in the parallel position) and as a parallelogram lever drive (six-member chain with four-member function), wherein the longitudinally displaceable element (26) of the slider crank drive represents the guide element (26) running on the support guide rail (24), and the parallelogram lever drive (15, 16) joins the intermediary part (14) with the guide element (25) that is longitudinally movable on the main guide rail (23).

5. A device for opening and closing vehicle doors as defined by claim 1, chracterized in that an auxiliary spring (31) operates between the body (11) and the intermediary part (14) at least in the closing direction of the door swivelling movement.

6. A device for opening and closing vehicle doors as defined by claim 5, characterized in that the auxiliary spring is embodied as a pneumatic spring (31), the compressible space of which that generates the spring action is switchable by means of a control valve and which is disposed substantially horizontally (FIG. 3).

7. A device for opening and ciosing vehicle doors as defined by claim 5, characterized in that the auxiliary spring is embodied as a compression spring, preferably in the form of a spring cylinder (71), the operative direction of which is disposed substantially transversely to the swivelling movement direction (swivelling plane), that it is pivotably joined to the body on the one hand and on the other hand to a sliding block (67) coupled with the intermediary part (14) and running on a stationary guide rod (66), so that depending on the pivoted position α, the spring action is in the closing direction, through neutral, to the opening direction of the vehicle door (10).

8. A device for opening and closing vehicle doors as defined by claim 1, characterized in that the actuating device has a lock, which couples the intermediary part (14) rigidly to the vehicle door (10).

9. A device for opening and closing vehicle doors as defined by claim 8, characterized in that the lock is embodied as a lifting bolt (56), which engages aligned bores, which are located in straps on the intermediary part (14) and on the vehicle door (10).

10. A device for opening and closing vehicle doors as defined by claim 4, characterized in that the transmission link system has at least one toggle lever (45), which is actuatable at its toggle joint, which has a stationary center of rotation on the vehicle door (10) and the opposite lever end of which runs in a guide and puts the guide element (26) of the slider crank drive into engagement with the support guide rail (24).

11. A device for opening and closing vehicle doors as defined by claim 10, characterized in that a restoring force (49) is provided, which retains the transmission linkage firmly in a stable position of repose for the swivelling mode of the vehicle door (10).

12. A device as defined by claim 1, characterized in that the window-raising device (37) of the door, as viewed from the interior of the vehicle, is shifted to outside the device, namely to between the device and the exterior panel of the door, and that the window pane 36 is preferably moved between the raising device (37) and the device (23 and 25).

13. A device for opening and closing vehicle doors as defined by claim 1, characterized in that during sliding operation (FIG. 4, position e) of the vehicle door (10), an additional rail (63) supported in an additional guide (61) joined to the vehicle door (10) is extensible in the displacement direction and can be made to rest on some point attached to the body, in particular on a shock absorber.

14. A device for opening and closing vehicle doors as defined by claim 13, characterized in that a ball sleeve serves as the additional guide and a hollow shaft serves as the additional rail.

15. A device for opening and closing vehicle doors as defined by claim 2, in which the lever work operates, depending on its functional position, as a slider crank drive (initial pivoting), as a six-member chain (swivelling in the parallel position) and as a parallelogram lever drive (six-member chain with four-member function), wherein the longitudinally displaceable element (26) of the slider crank drive represents the guide element (26) running on the support guide rail (24), and the parallelogram lever drive (15, 16) joins the intermediary part (14) with the guide element (25) that is longitudinally movable on the main guide rail (23).

16. A device for opening and closing vehicle doors as defined by claim 3, in which the lever work operates, depending on its functional position, as a slider crank drive (initial pivoting), as a six-member chain (swivelling in the parallel position) and as a parallelogram lever drive (six-member chain with four-member function), wherein the longitudinally displaceable element (26) of the slider crank drive represents the guide element (26) running on the support guide rail (24), and the parallelogram lever drive (15, 16) joins the intermediary part (14) with the guide element (25) that is longitudinally movable on the main guide rail (23).

17. A device for opening and closing vehicle doors as defined by claim 2, in which an auxiliary spring operates between the body (11) and the intermediary part (14) at least in the closing direction of the door swivelling movement.

18. A device for opening and closing vehicle doors as defined by claim 2, in which the actuating device has a lock, which couples the intermediary part (14) rigidly to the vehicle door (10).

19. A device for opening and closing vehicle doors as defined by claim 5, in which the transmission link system has at least one toggle lever (45), which is actuatable at its toggle joint, which has a stationary center of rotation on the vehicle door (10) and the opposite lever end of which runs in a guide and puts the guide element (26) of the slider crank drive into engagement with the support guide rail (24).

20. A device as defined by claim 2, in which the window-raising is shifted to outside the device, namely to between the device and the exterior panel of the door, and that the window pane 36 is preferably moved between the raising device (37) and the device (23 and 25).

21. A device for opening and closing vehicle doors as defined by claim 2, in which during sliding operation (FIG. 4, position e) of the vehicle door (10), an additional rail (63) supported in an additional guide (61) joined to the vehicle door (10) is extensible in the displacement direction and can be made to rest on some point attached to the body, in particular on a shock absorber.

* * * * *